F. E. WILCOX.
FIFTH WHEEL.
APPLICATION FILED NOV. 15, 1910.
1,012,778.
Patented Dec. 26, 1911.
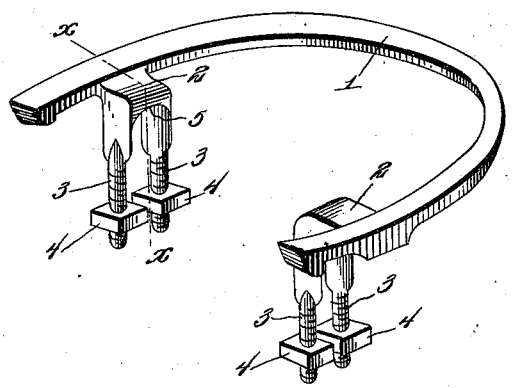
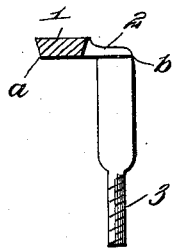
Witnesses
Inventor
Frank E. Wilcox
Attorney

UNITED STATES PATENT OFFICE.

FRANK E. WILCOX, OF MECHANICSBURG, PENNSYLVANIA, ASSIGNOR OF ONE-HALF TO HERBERT C. BROWN, OF MECHANICSBURG, PENNSYLVANIA.

FIFTH-WHEEL.

1,012,778.      Specification of Letters Patent.      Patented Dec. 26, 1911.

Application filed November 15, 1910. Serial No. 592,429.

*To all whom it may concern:*

Be it known that I, FRANK E. WILCOX, a citizen of the United States, residing at Mechanicsburg, in the county of Cumberland and State of Pennsylvania, have invented certain new and useful Improvements in Fifth-Wheels, of which the following is a specification.

This invention relates to fifth wheels for vehicles, and one of the principal objects of the invention is to improve the construction of the lower circle or segment of the fifth wheel for the purpose of simplifying the method of producing the fifth wheel and at the same time to provide integral offset clips for clamping the fifth wheel member to the axle of the vehicle.

Another object of the invention is to provide a fifth wheel member having offset clips which will provide a long bearing upon the axle and hence give greater security and firmness to the attachment of the fifth wheel member to said axle.

These and other objects may be attained by means of the construction illustrated in the accompanying drawing, in which, Figure 1 is a perspective view of a fifth wheel member made in accordance with my invention. Fig. 2 is a vertical sectional view taken on the line x—x of Fig. 1, and showing the nuts removed from the stem of the clips.

Referring to the drawing the numeral 1 designates the lower member or segment of a fifth wheel and 2 are the portions of the clips which are offset from the plane of the member 1 and provided with integral stems 3 which are preferably screw threaded to receive nuts 4 for clamping the member to the axle of the vehicle. The under surface of the portion 2 may be curved, as at 5 to fit the rounded upper surface of the axle. However, this form may be modified to suit axles of different contours and threaded stems 3 may be separated more or less, depending upon the width of the axle.

The steps necessary in the production of the fifth wheel member may be briefly referred to as follows: The steel bar is originally a plain straight bar of rectangular cross section. This bar is rolled in the center to reduce the size of the bar at that point. Without re-heating the bar, one end is formed by dies into a blank for the clips with the stems projecting parallel with the bar. The opposite end of the bar is then formed into a blank and the clips are parallel with the bar. The bar is then forged into a half round or flat shape and the stems are then screw-threaded and bent at right angles after which the member is finished.

Several advantages are gained by offsetting the clips from the plane of the circle or member 1 and they may be briefly referred to as follows: The steps necessary in the process of manufacturing this portion of a fifth wheel are very much simplified and facilitated, requiring less handling and dispensing with one or more of the steps necessary to produce the device. Furthermore an improved structure is provided owing to the fact that the clips provide a long bearing on the axle extending from $a$ to $b$, Fig. 2, instead of extending immediately downward from the member 1. The advantage of a long bearing for the clips resides in the fact that greater stability and firmness are given to the connection between the member and the axle.

It will be obvious that the clips may be offset either upon the outer or inner side of the member 1 without affecting the spirit or scope of my invention as included in the claim.

I claim:

A forged fifth wheel member made from a straight steel bar and comprising when finished, a curved body portion having integral clips extending inwardly upon opposite sides of said body portion, said clips having curved under surfaces to bear upon the under surface of the axle, said clips having downwardly extending integral threaded stems, said stems being spaced apart, and nuts fitted to the threaded ends of said stems for holding the member firmly connected to the axle.

In testimony whereof I affix my signature in presence of two witnesses.

FRANK E. WILCOX.

Witnesses:
     JAS. L. YOUNG,
     M. E. ANDERSON.

---

Copies of this patent may be obtained for five cents each, by addressing the "Commissioner of Patents, Washington, D. C."